(12) United States Patent
Okabe

(10) Patent No.: US 10,677,973 B2
(45) Date of Patent: Jun. 9, 2020

(54) POLARIZER PROTECTIVE SHEET, POLARIZER, AND LIQUID CRYSTAL DISPLAY DEVICE

(71) Applicant: KEIWA INC., Tokyo (JP)

(72) Inventor: Motohiko Okabe, Tokyo (JP)

(73) Assignee: KEIWA INC., Tokyo (JP)

(*) Notice: Subject to any disclaimer, the term of this patent is extended or adjusted under 35 U.S.C. 154(b) by 86 days.

(21) Appl. No.: 16/182,421

(22) Filed: Nov. 6, 2018

(65) Prior Publication Data
US 2019/0137674 A1 May 9, 2019

(30) Foreign Application Priority Data
Nov. 9, 2017 (JP) .................... 2017-216080

(51) Int. Cl.
*G02B 5/30* (2006.01)
*G02F 1/1335* (2006.01)
*F21V 8/00* (2006.01)

(52) U.S. Cl.
CPC ......... *G02B 5/3025* (2013.01); *G02B 6/0051* (2013.01); *G02B 6/0053* (2013.01); *G02B 6/0056* (2013.01); *G02F 1/133528* (2013.01); *G02F 1/133504* (2013.01); *G02F 2001/133567* (2013.01); *G02F 2201/50* (2013.01)

(58) Field of Classification Search
CPC .. G02B 5/3025; G02B 6/0051; G02B 6/0056; G02B 6/0053; G02B 1/14; G02B 5/0294; G02B 5/0231; G02B 5/0215; G02B 5/02; G02B 5/30; G02F 1/133528; G02F 2201/50; G02F 2001/133567; G02F 1/133504
See application file for complete search history.

(56) References Cited

U.S. PATENT DOCUMENTS

| | | | | |
|---|---|---|---|---|
| 2011/0267560 | A1* | 11/2011 | Usukura | G02B 6/0053 349/62 |
| 2015/0301384 | A1* | 10/2015 | Koike | G02F 1/133615 349/65 |
| 2016/0252665 | A1* | 9/2016 | Lee | G02B 5/305 359/489.07 |
| 2017/0010391 | A1* | 1/2017 | Lim | G02B 1/14 |
| 2018/0252968 | A1* | 9/2018 | Nakamura | G02F 1/133606 |

FOREIGN PATENT DOCUMENTS

JP 2015-040978 3/2015

* cited by examiner

*Primary Examiner* — Huyen L Ngo
(74) *Attorney, Agent, or Firm* — Knobbe, Martens, Olson & Bear, LLP

(57) ABSTRACT

A polarizer protective sheet includes a base material layer and a light diffusing layer formed on a surface of the base material layer. A plurality of protrusions are formed on an opposite surface of the light diffusing layer from the base material layer, and the protrusions have a substantially arc-shaped section. The average radius of the protrusions is 10 μm or more and 100 μm or less, and the average height of the protrusions is 10 μm or less.

7 Claims, 3 Drawing Sheets

POLARIZER PROTECTIVE SHEET, POLARIZER, AND LIQUID CRYSTAL DISPLAY DEVICE

CROSS-REFERENCE TO RELATED APPLICATION

This application claims priority to Japanese Patent Application No. 2017-216080 filed on Nov. 9, 2017, the entire disclosure of which is incorporated by reference herein.

BACKGROUND

The present disclosure relates to polarizer protective sheets and polarizers, which are used in liquid crystal display (LCD) devices, and LCD devices.

In recent years, flat displays such as LCDs and plasma displays have been widely used as display devices due to their space-saving design and high definition quality. Among others, the LCDs have attracted much attention and have been actively developed due to their power-saving features and high definition quality.

The LCDs are non-emitting display devices including, e.g., an LCD panel formed by a thin film transistor (TFT) substrate and a color filter (CF) substrate which are disposed so as to face each other and a liquid crystal layer enclosed between the TFT substrate and the CF substrate, and a backlight disposed on the back side of the LCD panel. The CF substrate has colored layers of, e.g., red, green, and blue for subpixels that form pixels.

In the LCD panel, polarizers that serve as a light shutter are combined with liquid crystal. The polarizer includes a polarizing element. Since polarizing elements are typically produced by uniaxially stretching a polyvinyl alcohol resin to five to six times its original length in a water tank, the polarizing elements are brittle and easily torn in the stretching direction. A protective film is therefore bonded to the front and/or back surface of the polarizing element.

In recent years, LCD devices using a functional film having multiple functions have been proposed in order to meet the demand for smaller devices. More specifically, for example, an LCD device is disclosed which includes a polarizer protective sheet formed by melt-extruding a thermoplastic resin from a molding die into a sheet and forming a concavo-convex pattern on one surface of the thermoplastic resin sheet (see, e.g., Japanese Unexamined Patent Publication No. 2015-40978).

SUMMARY

In the LCD device disclosed in Japanese Unexamined Patent Publication No. 2015-40978, when the polarizer protective sheet with a randomly shaped surface etc. contacts a prism sheet, there are regions where a pressure to the prism sheet is not sufficiently dispersed. Accordingly, when an impact force is applied to the LCD panel, the polarizer protective sheet contacts prism ridges of the prism sheet that forms a backlight unit and the prism sheet is damaged.

It is an object of the present disclosure to provide a polarizer protective sheet capable of achieving reduction in thickness of devices and restraining damage to a prism sheet which is caused when an impact force is applied.

In order to achieve the above object, a polarizer protective sheet of the present disclosure is a polarizer protective sheet including: a base material layer; and a light diffusing layer formed on a surface of the base material layer. A plurality of protrusions are formed on an opposite surface of the light diffusing layer from the base material layer, and the protrusions have a substantially arc-shaped section. An average radius of the protrusions is 10 µm or more and 100 µm or less, and an average height of the protrusions is 10 µm or less.

According to the present disclosure, even when an optical member disposed so as to face the light diffusing layer, for example, a prism sheet of a backlight unit, contacts the polarizer protective sheet, a pressure to the prism sheet can be dispersed. This restrains damage to the prism sheet which is caused when an impact force is applied, and also achieves reduction in thickness of LCD devices.

DETAILED DESCRIPTION

An embodiment of the present disclosure will be described in detail with reference to the accompanying drawings.

Figure 1:
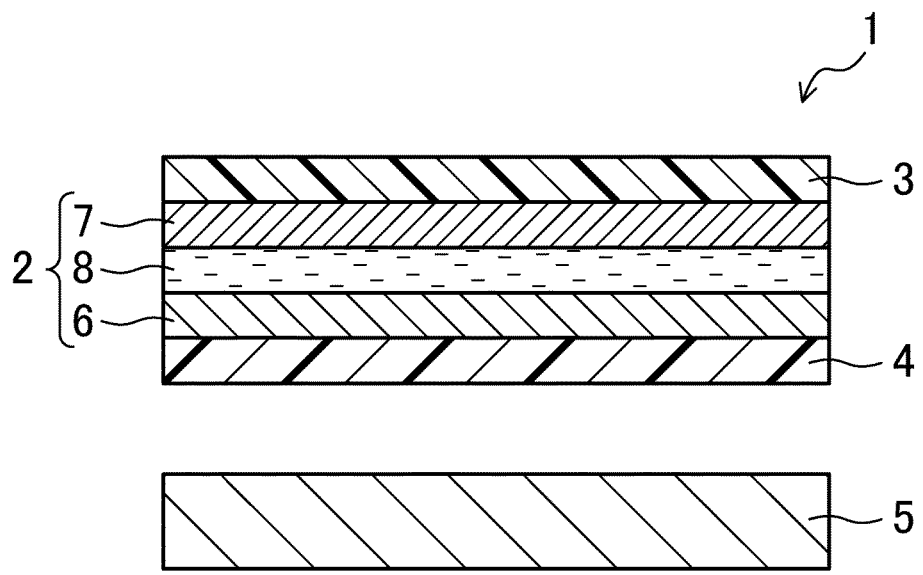
FIG. 1 is a sectional view of an LCD device according to an embodiment of the present disclosure.
Figure 2:
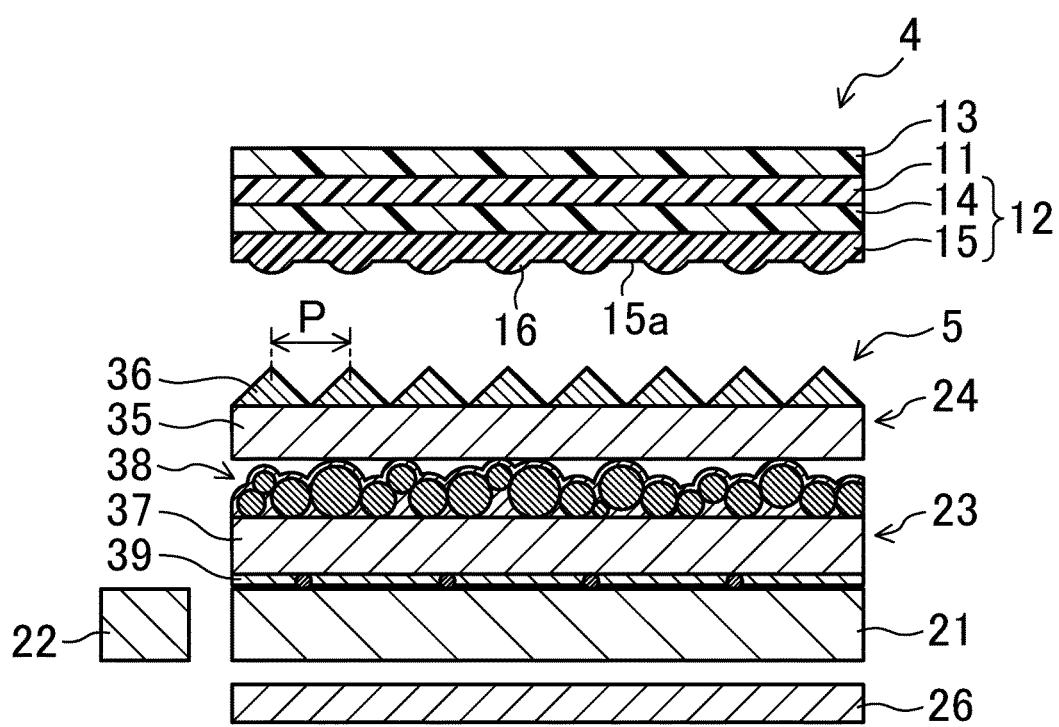
FIG. 2 is a sectional view illustrating a polarizer and a backlight unit of the LCD device according to the embodiment of the present disclosure.
Figure 3:
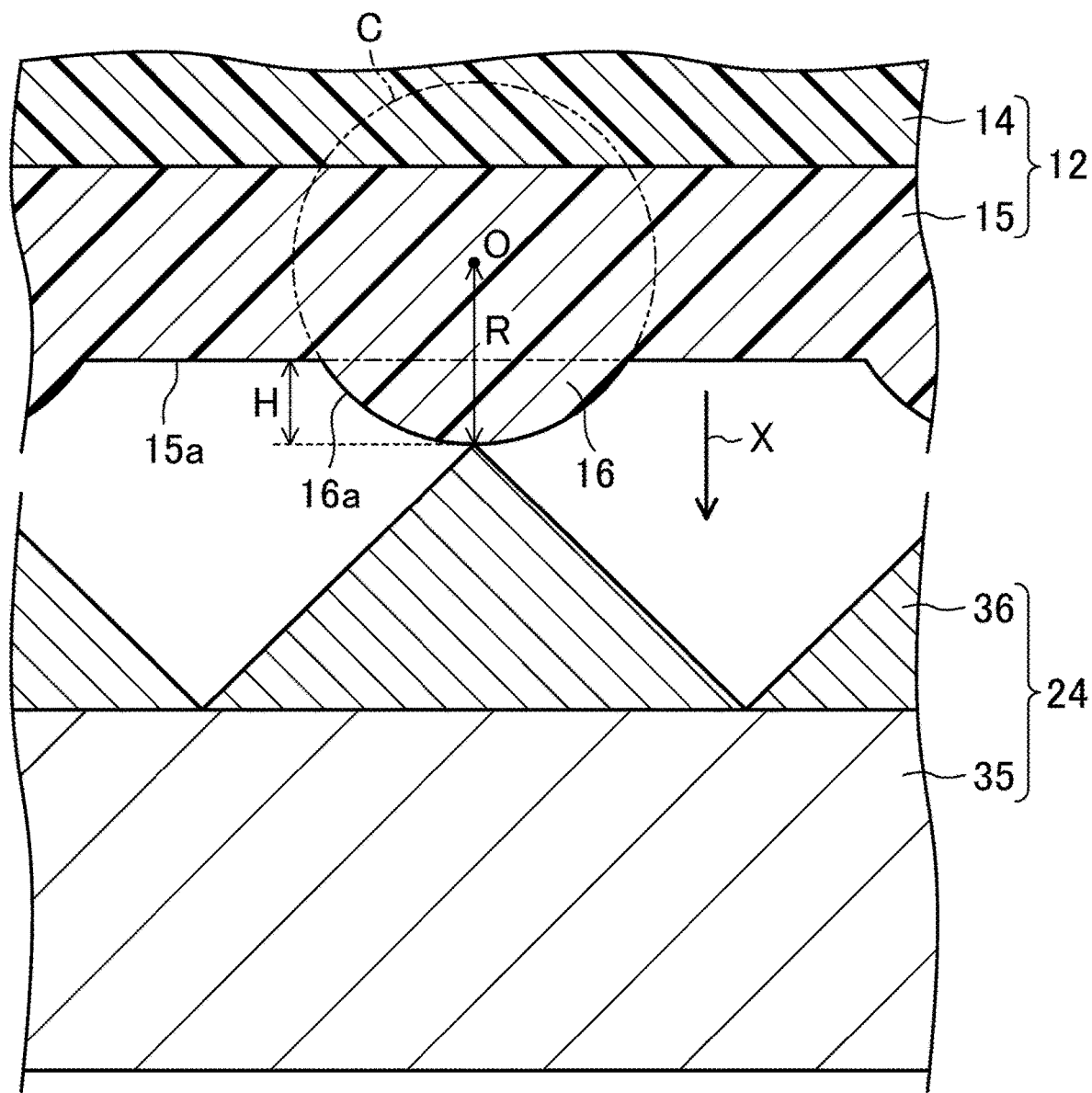
FIG. 3 is a sectional view illustrating a polarizer protective sheet of the LCD device according to the embodiment of the present disclosure.

FIG. 1 is a sectional view of an LCD device according to an embodiment of the present disclosure. FIG. 2 is a sectional view illustrating a polarizer and a backlight unit of the LCD device according to the embodiment of the present disclosure. FIG. 3 is a sectional view illustrating a polarizer protective sheet of the LCD device according to the embodiment of the present disclosure.

As shown in FIG. 1, an LCD device 1 includes: an LCD panel 2 in which a plurality of pixels are arranged in a matrix pattern; a first polarizer 3 (hereinafter sometimes simply referred to as the "polarizer 3") bonded to the front side (the upper side in the figure, the viewer side of the LCD device 1) of the LCD panel 2; a second polarizer 4 (hereinafter sometimes simply referred to as the "polarizer 4") bonded to the back side (the rear side, the lower side in the figure, the opposite side of the LCD device 1 from the viewer side) of the LCD panel 2; and a backlight unit 5 provided on the back side of the LCD panel 2.

As shown in FIG. 1, the LCD panel 2 includes a TFT substrate 6 that is a first substrate, a CF substrate 7 that is a second substrate disposed so as to face the TFT substrate 6, a liquid crystal layer 8 interposed between the TFT substrate 6 and the CF substrate 7, and a frame-shaped sealant (not shown) bonding the TFT substrate 6 and the CF substrate 7 and enclosing the liquid crystal layer 8 between the TFT substrate 6 and the CF substrate 7.

The TFT substrate 6 and the CF substrate 7 are formed in the shape of a rectangular plate. The LCD device 1 further includes a plurality of photo spacers (not shown) that control the thickness (i.e., cell gap) of the liquid crystal layer 8.

For example, the TFT substrate 6 includes: an insulating substrate such as a glass substrate or a plastic substrate; a plurality of gate lines formed on the insulating substrate and extending parallel to each other; a plurality of source lines extending parallel to each other in a direction perpendicular to the gate lines; a plurality of TFTs formed at every intersection of the gate and source lines, namely for every sub-pixel Pr, Pg, Pb; a protective film covering the TFTs; a plurality of pixel electrodes arranged in a matrix pattern on the protective film and connected to the TFTs; and an alignment film (not shown) covering the pixel electrodes.

The CF substrate 7 includes an insulating substrate such as a glass substrate or a plastic substrate, a common electrode formed on the insulating substrate, and an alignment film covering the common electrode (all of which are not shown).

The liquid crystal layer 8 is made of a nematic liquid crystal material having electrooptical properties, etc.

Polarizer

As shown in FIG. 2, the second polarizer 4 includes a polarizing element 11 and a pair of polarizer protective sheets (hereinafter sometimes simply referred to as the "protective sheets") 12, 13 disposed on the polarizing element 11.

The polarizing element 11 is not particularly limited and may be a conventionally known polarizer. Examples of the polarizing element 11 include a uniaxially stretched hydrophilic polymer film (such as polyvinyl alcohol film, partially formalized polyvinyl alcohol film, or ethylene-vinyl acetate copolymer-based partially saponified film) with a dichroic material such as iodine or dichroic dye adsorbed therein, and a polyene alignment film such as dehydrated polyvinyl alcohol or dehydrochlorinated polyvinyl chloride.

As shown in FIG. 2, of the protective sheets 12, 13, the protective sheet 12 is disposed so as to face prism ridges of a prism sheet that forms the backlight unit 5.

The protective sheet 12 has a two-layer structure of a base material layer 14 and a light diffusing layer 15 formed on the surface of the base material layer 14. The light diffusing layer 15 is disposed on the opposite side of the base material layer 14 from the polarizing element 11.

The base material layer 14 is preferably made of a material having high transparency, high mechanical strength, good thermal stability, good high moisture barrier properties, high isotropy, etc. Examples of such a material include: polyester resins such as polyethylene terephthalate and polyethylene naphthalate; cellulose resins such as cellulose diacetate and cellulose triacetate; acrylic resins such as polymethyl methacrylate; styrene resins such as polystyrene and acrylonitrile-styrene copolymers (AS resins); polycarbonate resins; polyolefin resins such as polyethylene, polypropylene, polyolefins having a cyclo or norbomene structure, and ethylene-propylene copolymers; vinyl chloride resins; amide resins such as nylon and aromatic polyamides; imide resins; sulfone resins; polyether sulfone resins; polyether ether ketone resins; polyphenylene sulfide resins; vinyl alcohol resins; vinylidene chloride resins; vinyl butyral resins; arylate resins; polyoxymethylene resins; epoxy resins; and mixtures thereof.

As shown in FIG. 2, the protective sheet 13 does not include the light diffusing layer 15, and for example, may be made of the same material as the base material layer 14.

The light diffusing layer 15 is made of an active energy ray-curable resin such as an ultraviolet (UV)-curable resin that is crosslinked and cured by UV radiation or an electron beam-curable resin that is crosslinked and cured by electron beam radiation. The light diffusing layer 15 may be made of a material selected as appropriate from polymerizable monomers and polymerizable oligomers. Among these materials, an acrylic, urethane, or acrylic urethane UV-curable resin is preferred.

As shown in FIG. 2, the present embodiment is characterized in that the light diffusing layer 15 has a plurality of protrusions 16 formed at its surface 15a, namely the surface on the opposite side of the light diffusing layer 15 from the base material layer 14, and the protrusions 16 have a substantially arc-shaped section.

In other words, the present embodiment is characterized in that a part of the surface of the light diffusing layer 15 has convex arc-shaped surfaces.

With this configuration, as shown in FIG. 3, even when an impact force is applied to the LCD panel 2 in a ball drop test etc. and the second polarizer 4 is moved toward a prism sheet 24 of the backlight unit 5 (i.e., in the direction of arrow X in the figure) and the protective sheet 12 contacts prism ridges 36 of the prism sheet 24, the pressure to the prism ridges 36 can be dispersed. This restrains damage to the prism sheet 24 which is caused when an impact force is applied.

As used herein, the expression "substantially arc-shaped" means a shape that substantially matches a part of an arc.

In the present embodiment, in order to enhance the above pressure dispersion effect and reduce the force that is applied to the prism ridges 36, it is preferable that the protrusions 16 shown in FIG. 3 have a larger average radius R. However, if the average radius R of the protrusions 16 is too large, the surfaces of the protrusions 16 become closer to flat surfaces, which reduces the pressure dispersion effect. Moreover, the protective sheet 12 more easily contacts the prism ridges 36 of the prism sheet 24. In order to avoid such contact, the LCD panel 2 and the backlight unit 5 need be separated from each other, which may make it difficult to achieve reduction in thickness of the LCD device 1. If the average radius R of the protrusions 16 is too small, the pressure dispersion effect may not be sufficient.

In the present embodiment, the average radius R of the protrusions 16 is set to 10 µm or more and 100 µm or less in order to achieve reduction in thickness of the LCD device 1 and restrain damage to the prism sheet which is caused when an impact force is applied.

As used herein, the "average radius of the protrusions" refers to the average value of the radii R (see FIG. 3) of ten randomly extracted protrusions 16 with a substantially arc-shaped section.

The "radius R" refers to the radius of a circle C including an outer surface 16a of the protrusion 16 as a part of an arc, as shown in FIG. 3.

The average height H of the protrusions 16 shown in FIG. 3 is 10 µm or less, preferably 8 µm or less, more preferably 5 µm or less.

If the average height H is larger than 10 µm, the protective sheet 12 more easily contacts the prism ridges 36 of the prism sheet 24. Accordingly, the LCD panel 2 and the backlight unit 5 need be separated from each other, which may make it difficult to achieve reduction in thickness of the LCD device 1.

As used herein, the "average height of the protrusions" refers to the average value of the heights H from the base to the protruding end of ten randomly extracted protrusions 16.

As shown in FIG. 3, the "height H" refers to the length from the lowest position of the protrusion 16 (i.e., the surface 15a of the light diffusing layer 15 which is the base of the protrusion 16) to the top (i.e., the protruding end) of the protrusion 16 in the section (width: 100 to 300 µm) of the light diffusing layer 15 measured by a measuring machine capable of measuring the top and the section of the protrusion 16 such as a laser microscope.

In the present embodiment, the protective sheet 12 has such a light diffusing layer 15. Accordingly, the protective sheet 12 has a light diffusing function in addition to a polarizer protecting function. The backlight unit 5 therefore need not have an upper light diffusion sheet. Reduction in size of the backlight unit 5 is thus achieved.

Moreover, unlike the conventional light diffusing layers, the light diffusing layer 15 does not need to contain any light diffusing agent such as inorganic compound particles or organic compound (polymer) particles. Accordingly, even if the light diffusing layer 15 contacts the prism sheet 24, damage to the prism sheet 24 due to the light diffusing agent is restrained.

It is preferable that the surface resistivity of the light diffusing layer 15 be $10 \times 10^{14} \Omega/\square$ or less. This configuration restrains the light diffusing layer 15 from being electrically charged by friction with other members etc. and thus restrains foreign matter from being attracted to the surfaces of the protrusions 16 of the light diffusing layer 15. The prism sheet is thus restrained from being damaged by such foreign matter when an impact force is applied in a ball drop test etc.

As used herein, the "surface resistivity" means the surface resistivity that is measured in accordance with JIS K 6911: 2006.

It is preferable that the haze value of the protective sheet 12 be 20% or more and 90% or less. If the haze value is less than 20%, phenomena such as moire (interference fringes), which is interference between prisms, and sparkles (graininess), which are interference between the light diffusing layer and the LCD panel, may not be eliminated. If the haze value is more than 90%, the amount of light that reaches the front surface of the screen may decrease and front luminance may decrease accordingly.

As used herein, the "haze value" means a haze value that is measured in accordance with JIS K 7136:2000.

Backlight Unit

The backlight unit 5 is an edge light-type backlight unit. As shown in FIG. 2, the backlight unit 5 includes: a light guide sheet 21 that guides a light beam received through its end face toward its front surface; a light source 22 that emits a light beam toward the end face of the light guide sheet 21; a light diffusing sheet 23 superimposed on the front side of the light guide sheet 21; and a prism sheet 24 that is placed on the front side of the light diffusing sheet 23. The backlight unit 5 further includes a reflective sheet 26 placed on the back side of the light guide sheet 21.

The light diffusing sheet 23 has a function to diffuse a light beam received from its back side and collects the light beam in a normal direction (light collecting and diffusing function). The prism sheet 24 has a function to refract a light beam received from its back side in a normal direction. The reflective sheet 26 has a function to reflect a light beam emitted from the back side of the light guide sheet 21 toward the front side thereof to return the reflected light beam into the light guide sheet 21.

Prism Sheet

As shown in FIG. 2, the prism sheet 24 is disposed so as to face the polarizer 4. The prism sheet 24 is mainly made of a transparent synthetic resin, especially a colorless transparent synthetic resin, because the prism sheet 24 needs to transmit a light beam therethrough. The prism sheet 24 has a base material layer 35 and a series of protrusions that are a plurality of prism ridges 36 disposed on the surface of the base material layer 35. The prism ridges 36 are arranged in a stripe pattern on the surface of the base material 35. The prism ridges 36 are triangular prism elements that are in contact with the surface of the base material layer 35.

The lower limit of the thickness of the prism sheet 24 (the height from the back surface of the base material layer 35 to the apex of the prism ridge 36) is preferably 50 μm, more preferably 100 μm. The upper limit of the thickness of the prism sheet 24 is preferably 200 μm, more preferably 180 μm.

The lower limit of the pitch P (see FIG. 2) of the prism ridges 36 in the prism sheet 24 is preferably 20 μm, more preferably 30 μm. The upper limit of the pitch P of the prism ridges 36 in the prism sheet 24 is preferably 100 μm, more preferably 60 μm.

The apex angle of the prism ridges 36 is preferably 85° or more and 95° or less. The lower limit of the refractive index of the prism ridges 36 is preferably 1.5, more preferably 1.55. The upper limit of the refractive index of the prism ridges 36 is preferably 1.7.

Light Diffusing Sheet

The light diffusing sheet 23 has a base material layer 37, a light diffusing layer 38 formed on the front side of the base material layer 37, and a sticking preventing layer 39 formed on the back side of the base material layer 37.

The base material layer 37 of the light diffusing sheet 23 is mainly made of a transparent synthetic resin, especially a colorless transparent synthetic resin, because the base material layer 37 need to transmit a light beam therethrough. The main component of the base material layer 37 is not particularly limited, and for example, may be polyethylene terephthalate, polyethylene naphthalate, acrylic resin, polycarbonate, polystyrene, polyolefin, cellulose acetate, weather-resistant vinyl chloride, etc.

The light diffusing layer 38 of the light diffusing sheet 23 has a light diffusing material and its binder. Light diffusing materials are particles having light diffusing properties and are roughly divided into inorganic fillers and organic fillers. Examples of the inorganic fillers include silica, aluminum hydroxide, aluminum oxide, zinc oxide, barium sulfide, magnesium silicate, and mixtures thereof. Examples of the organic fillers include acrylic resin, acrylonitrile resin, polyurethane, polyvinyl chloride, polystyrene, polyamide, and polyacrylonitrile.

The shape of the light diffusing material is not particularly limited, and for example, may be a sphere, a cube, a needle, a rod, a spindle, a plate, a scale, or a fiber. Spherical beads with excellent light diffusing properties are especially preferable.

The sticking preventing layer 39 is made of a resin matrix with resin beads dispersed therein. The resin beads are dispersedly located on the back side of the base material layer 37. Since the resin beads are dispersedly located, the sticking preventing layer 39 has a plurality of protrusions formed by the resin beads and a flat portion where there is no resin bead. The sticking preventing layer 39 dispersedly contacts the light guide sheet 21 placed on its back side at the plurality of protrusions. Namely, not the entire back surface of the sticking preventing layer 39 contacts the light guide sheet 21. This prevents sticking and restrains uneven luminance of the LCD device 1.

Light Guide Sheet

The light guide sheet 21 is a sheet-like optical member that propagates therein a light beam received from the light source 22 and emits the light beam from its surface. The light guide sheet 21 may have a substantially wedge-shaped section or may be substantially in the shape of a flat plate.

The light guide sheet 21 is mainly made of a transparent resin, especially a colorless transparent resin, because the light guide sheet 21 need to be transparent to light. The main component of the light guide sheet 21 is not particularly limited, and for example, may be a synthetic resin such as polycarbonate having high transparency, high strength, etc. or acrylic resin having high transparency, high scratch resistance, etc. The main component of the light guide sheet 21 is preferably polycarbonate. Since polycarbonate has high transparency and a high refractive index, total reflection tends to occur at the interfaces with air layers (a layer formed in the clearance between the light guide sheet 21 and the light diffusing sheet 23 formed on the front side of the light guide sheet 21 and a layer formed in the clearance between the light guide sheet 21 and the reflective sheet 26 formed on the back side of the light guide sheet 21), whereby a light beam can be efficiently propagated. Since polycarbonate has heat resistance, deterioration due to heat generation of the light source 22 etc. is less likely to occur.

Light Source

The light source 22 is disposed such that its emitting surface faces (or contacts) the end face of the light guide sheet 21. Various types of light source may be used as the light source 22. For example, a light emitting diode (LED) may be used. Specifically, the light source 22 may be a plurality of LEDs arranged along the end face of the light guide sheet 21.

Reflective Sheet

The reflective sheet 26 may be a white sheet made of a base material resin such as polyester with a filler dispersed therein, a mirror sheet formed by depositing a metal such as aluminum or silver on the surface of a film made of polyester etc. so as to have enhanced regular reflection properties, etc.

As described above, in the present embodiment, the light diffusing layer 15 is made of an active energy ray-curable resin. Accordingly, the protrusions 16 can be formed by forming the active energy ray-curable resin by a press member 40 and then irradiating the formed active energy ray-curable resin with active energy rays. The protrusions 16 can thus be easily formed at low cost.

For example, the press member 40 may be a press roll having a plurality of recesses with a substantially arc-shaped section formed at its surface. The use of the press roll allows the plurality of protrusions 16 to be efficiently formed on the surface of the light diffusing layer 15 in the manufacturing process.

Manufacturing Method of Polarizer Protective Sheet

Figure 4:
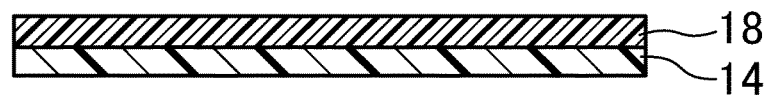
FIG. 4 is a sectional view illustrating a method for manufacturing the polarizer protective sheet of the LCD device according to the embodiment of the present disclosure.

In a method for manufacturing the protective sheet 12, as shown in FIG. 4, a sheet material (e.g., a PET film) that forms the base material layer 14 is first prepared, and one surface of the sheet material is coated with an active energy ray-curable resin (e.g., acrylic resin) 18 such as a UV-curable resin which forms the light diffusing layer 15.

Figure 5:
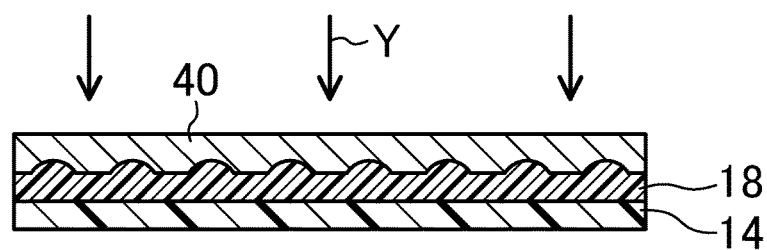
FIG. 5 is a sectional view illustrating the method for manufacturing the polarizer protective sheet of the LCD device according to the embodiment of the present disclosure.

Next, as shown in FIG. 5, the press member 40 having a plurality of recesses with a substantially arc-shaped section formed at its surface is pressed against and pressure-bonded to the active energy ray-curable resin 18. In this state, the active energy ray-curable resin 18 is irradiated with active energy rays Y such as UV rays for a predetermined time to cure the active energy ray-curable resin 18. The light diffusing layer 15 having a plurality of protrusions 16 on its surface is thus formed, and the press member 40 is separated and removed from the light diffusing layer 15. The protective sheet 12 shown in FIGS. 2 and 3 is thus manufactured.

The light diffusing layer 15 may have an approximately corrugated section. That is, in addition to the protrusions 16, the surface 15a of the light diffusing layer 15 may be recessed so that the overall surface of the light diffusing layer 15 has a corrugated shape. This configuration also has the same effects as those of the above embodiment.

EXAMPLES

The present disclosure will be described based on examples. The present disclosure is not limited to the examples. The examples may be altered or modified without departing from the spirit and scope of the invention, and such alterations and modifications are not intended to be excluded from the scope of the invention.

Example 1

Production of Protective Sheet

First, a PET film (23 μm thick) was prepared, and one surface of the PET film was coated with an uncured UV-curable acrylic resin (made by Dainichiseika Color & Chemicals Mfg. Co., Ltd., tradename: Seika Beam PET-DIF6) mixed with an antistatic agent.

Next, a press roll having a plurality of recesses with a substantially arc-shaped section formed at its surface was pressed against and pressure-bonded to the acrylic resin. In this state, the acrylic resin was cured by UV radiation (120 mJ).

The cured acrylic resin was separated from the press roll. A protective sheet of the present embodiment, namely a protective sheet having 806 protrusions per square millimeter (average radius: 25 μm) on the surface of a light diffusing layer, was thus produced.

The average radius of the protrusions was measured by carrying out three-dimensional surface measurement of the light diffusing layer with a laser microscope (made by KEYENCE CORPORATION, tradename: Laser Microscope VK-X100) and computing, for each of randomly extracted ten protrusions, an arc passing through three points of the protrusion based on a profile passing through the top of the protrusion by using analysis software and computing the average radius from the computed arcs. The average radius thus obtained was 25 μm.

Measurement of Average Height of Protrusions

The average height of the protrusions was measured by carrying out three-dimensional surface measurement of the light diffusing layer with a laser microscope (made by KEYENCE CORPORATION, tradename: Laser Microscope VK-X100) and measuring, for each of randomly extracted ten protrusions, the length from the surface of the light diffusing layer, which is the base, to the top part of the protrusion based on a profile passing through the top of the protrusion by using analysis software and computing the average value of the measured lengths. The average height thus obtained was 5 μm.

Measurement of Surface Resistivity

The coating layer of the sheet was left to stand at 23° C.×50%/RH for 24 hours and the surface resistivity of the coating layer was then measured at 23° C.×50%/RH with "SM-8220" and "SME-8310," both made by DKK-TOA CORPORATION, in accordance with JIS K 6911:2006. The measured surface resistivity of the light diffusing layer was $10 \times 10^{12} \Omega/\square$.

Measurement of Haze Value

The haze value was measured with "HZ-2" made by Suga Test Instruments Co., Ltd. in accordance with JIS K 7136: 2000. The measured haze value was 52%.

Ball Drop Evaluation

A 475 µm thick polycarbonate film imitating a light guide sheet was laminated on the surface of a 5 mm thick stainless plate, and a light diffusing sheet, a first prism sheet, and a second prism sheet were laminated thereon in this order. The first prism sheet and the second prism sheet were arranged so that the apexes of a series of prisms protrude toward the front side and the ridgelines of the series of prisms of the first and second prism sheets extend perpendicular to each other.

The produced protective sheet was then bonded to the back surface of an LCD panel with an adhesive layer therebetween, and the resultant LCD panel was placed so as to face the second prism sheet.

Thereafter, a stainless sphere with a diameter of 11 mm was dropped from the height of 150 m onto the front side of the LCD panel. The second prism sheet was then visually checked for any scratches on the second prism sheet. Evaluation was made based on the following criteria. The result is shown in Table 1.

○: no scratch was seen
x: scratch(es) was seen

Evaluation of Adhesion to Prism Sheet

An LCD module using the LCD panel was assembled. With the LCD module turned on, a load of 200 g/cm$^2$ was applied to the panel side of the LCD module, and the LCD module was visually checked for any bright lines due to adhesion to prisms. Evaluation was made based on the following criteria. The result is shown in Table 1.

○: no bright line was seen
x: bright line(s) was seen

Moire Evaluation

An LCD module using the LCD panel was assembled. With the LCD module turned on, the LCD module was visually checked for any moire due to prisms. Evaluation was made based on the following criteria. The result is shown in Table 1.

○: no moire was seen
x: moire was seen

Sparkle Evaluation

An LCD device module using the LCD panel was assembled. With the LCD module turned on, a green screen of the LCD module was seen at a distance of 15 cm to check for any sparkle pattern. Evaluation was made based on the following criteria. The result is shown in Table 1.

○: no sparkle was seen
x: sparkle(s) was seen

Example 2

A protective sheet was produced in a manner similar to that of Example 1 except that a different press roll was used and the average radius of protrusions was set to 10 µm.

The average height of the protrusions, the surface resistivity, and the haze value were measured in a manner similar to that of Example 1 and the above evaluations were carried out. The result is shown in Table 1.

Example 3

A protective sheet was produced in a manner similar to that of Example 1 except that a different press roll was used and the average radius of protrusions was set to 100 µm.

The average height of the protrusions, the surface resistivity, and the haze value were measured in a manner similar to that of Example 1 and the above evaluations were carried out. The result is shown in Table 1.

Example 4

A protective sheet was produced in a manner similar to that of Example 1 except that a smaller amount of antistatic agent was added to an uncured UV-curable acrylic resin.

The average height of the protrusions, the surface resistivity, and the haze value were measured in a manner similar to that of Example 1 and the above evaluations were carried out. The result is shown in Table 1.

Comparative Example 1

A protective sheet was produced in a manner similar to that of Example 1 except that a different press roll was used and the average radius of protrusions was set to 7 µm.

The average height of the protrusions, the surface resistivity, and the haze value were measured in a manner similar to that of Example 1 and the above evaluations were carried out. The result is shown in Table 1.

Comparative Example 2

A protective sheet was produced in a manner similar to that of Example 1 except that a different press roll was used and the average radius of protrusions was set to 115 µm.

The average height of the protrusions, the surface resistivity, and the haze value were measured in a manner similar to that of Example 1 and the above evaluations were carried out. The result is shown in Table 1.

Comparative Example 3

A protective sheet was produced in a manner similar to that of Example 1 except that a different press roll was used and the average height of protrusions was set to 12 µm.

The average height of the protrusions, the surface resistivity, and the haze value were measured in a manner similar to that of Example 1 and the above evaluations were carried out. The result is shown in Table 1.

TABLE 1

|  | Example 1 | Example 2 | Example 3 | Example 4 | Comparative Example 1 | Comparative Example 2 | Comparative Example 3 |
| --- | --- | --- | --- | --- | --- | --- | --- |
| Average Radius of Protrusions [µm] | 25 | 10 | 100 | 25 | 7 | 115 | 25 |
| Average Height of Protrusions [µm] | 5 | 3 | 9 | 5 | 5 | 7 | 12 |
| Surface Resistivity [Ω/□] | $10 \times 10^{12}$ | $10 \times 10^{12}$ | $10 \times 10^{12}$ | $10 \times 10^{14}$ | $10 \times 10^{12}$ | $10 \times 10^{12}$ | $10 \times 10^{12}$ |
| Haze Value [%] | 52 | 39 | 61 | 52 | 65 | 50 | 57 |
| Ball Drop Evaluation | ○ | ○ | ○ | ○ | X | X | X |
| Adhesion Evaluation | ○ | ○ | ○ | ○ | ○ | X | ○ |
| Moire | ○ | ○ | ○ | ○ | ○ | ○ | ○ |
| Sparkles | ○ | ○ | ○ | ○ | ○ | ○ | ○ |

The results in Table 1 show that, in Examples 1 to 4 in which the average radius of the protrusions of the light diffusing layer is 10 µm or more and 100 µm or less and the average height of the protrusions is 10 µm or less, damage to the prism sheet which is caused when an impact force is applied in a ball drop test can be restrained. The results in Table 1 also show that neither moire nor sparkles were seen in Examples 1 to 4.

As described above, the present disclosure is especially useful for polarizer protective sheets for LCD devices and polarizers including such a polarizer protective sheet.

What is claimed is:

1. A polarizer protective sheet, comprising:
   a base material layer; and
   a light diffusing layer formed on a surface of the base material layer, wherein
   a plurality of protrusions are formed on an opposite surface of the light diffusing layer from the base material layer, and the protrusions have a substantially arc-shaped section, and
   an average radius of the protrusions is 10 µm or more and 100 µm or less, and an average height of the protrusions is 10 µm or less.

2. The polarizer protective sheet of claim 1, wherein surface resistivity of the light diffusing layer is $10 \times 10^{14} \Omega/\square$ or less.

3. The polarizer protective sheet of claim 1, wherein a haze value is 20% or more and 90% or less.

4. The polarizer protective sheet of claim 1, wherein the light diffusing layer is made of an active energy ray-curable resin.

5. The polarizer protective sheet of claim 1, wherein the light diffusing layer contains no light diffusing agent.

6. A polarizer, comprising:
   a polarizing element; and
   the polarizer protective sheet of claim 1 placed on a surface of the polarizing element, wherein
   the light diffusing layer is disposed on an opposite side from the polarizing element.

7. An LCD device, comprising:
   an LCD panel;
   the polarizer of claim 6 placed on a surface of the LCD panel; and
   a backlight unit having a prism sheet disposed so as to face the polarizer.

* * * * *